Patented July 8, 1924.

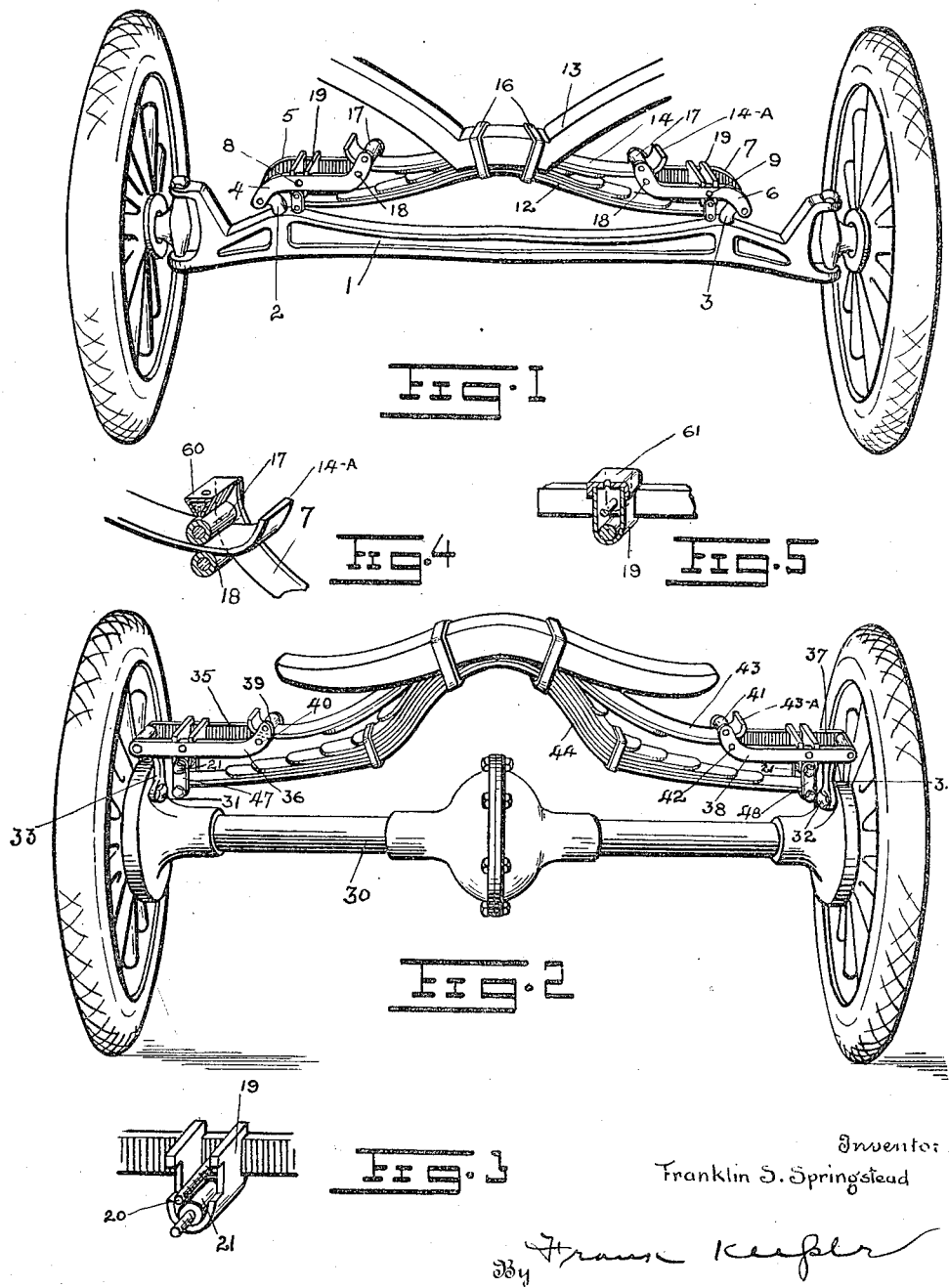

1,500,655

UNITED STATES PATENT OFFICE.

FRANKLIN S. SPRINGSTEAD, OF ROCHESTER, NEW YORK.

SHOCK ABSORBER.

Application filed January 13, 1923. Serial No. 613,512.

*To all whom it may concern:*

Be it known that I, FRANKLIN S. SPRINGSTEAD, a citizen of the United States, residing at Rochester, in the county of Monroe and State of New York, have invented certain new and useful Improvements in Shock Absorbers, of which the following is a specification.

The object of this invention is to provide a new and improved shock absorbing spring support for auto chassis.

This and other objects of my invention will be fully illustrated in the drawings, described in the specification and pointed out in the claims at the end thereof.

In the accompanying drawing:

Figure 1 is a perspective view of the front axle of a Ford car with my improved shock absorber interposed between the spring and perches and the body of the car.

Figure 2 is a perspective view of the rear axle of a Ford car with my improved shock absorber interposed between the spring and perches and the body of the car.

Figure 3 is a perspective view of the connection between the shackle and the lever of the shock absorber.

Figure 4 is a perspective view of the end of the spring connecting with the end of the lever of the shock absorber and oiling device being shown in connection therewith.

Figure 5 is a perspective view of the connection shown in Figure 3 with an oiling device combined therewith.

In the drawings, like reference numerals indicate like parts.

Shock absorbers for automobiles are intended to absorb the shocks and jolts given to the body of the car when the wheels thereof strike obstructions or depressions in the road over which the car travels. Many of such devices are being made and used on automobiles and while these absorb the shock it has been found that their reaction to a shock is very unpleasant and is sometimes so powerful on the car body that it overturns the car.

In my present invention this danger in reaction of the shock absorbing members is eliminated by changing the direction of part of the force so that the one force will counteract the other force while the shock is being absorbed and the reaction takes place.

In Figure 1 is illustrated the application of my invention to the front axle of a Ford automobile. It is well known that in this type of car the body is supported by means of two springs one on the front axle and one on the rear axle of the car.

In Figure 1 reference numeral 1 indicates the front axle. On this axle is regularly placed the perches 2 and 3 which perches in a Ford car extend inwardly toward each other at the top and from them hang the shackles or links which support the ends of the spring in a state of suspension. In the use of my invention the positions of these perches are reversed so that the upper ends of them point outward toward the wheels. To these perches 2 and 3 are pivoted the outer ends of the levers 4 and 5 and 6 and 7. At the points indicated at 8 and 9 are provided bolts which pass through the levers and hold them together in engagement with the metal yoke 19.

Reference numeral 12 indicates the long spring that is regularly furnished on the Ford car on which spring normally rests the support 13 which carries the car body. Between the spring 12 and the support 13, as part of my invention, I interpose a short spring 14. This spring 14 is special and forms part of my invention. The two springs 12 and 14 are fastened to the support 13 by the original clamps 16 that are regularly found on a Ford car. The inner ends of the levers 4 and 5 and 6 and 7 are each provided with two parallel rollers 17 and 18 suitably supported between the ends of the levers by bolts or rivets that pass through the levers and connect them together. The rollers are suitably spaced apart one above the other to receive the ends of the spring 14. As the spring 14 bends because of the shock the ends of the springs play out and in between the rollers between which at all times they have free play and by which they are firmly held in place. As shown in Figures 1 and 4 the ends of the spring are curved up as indicated at 14ᴬ forming hooks or stops which on the rebound engages the upper roller 17 and retard the further upward movement of the car body so that it cannot rise further without taking the chassis with it.

As indicated at 19 a metal yoke is provided which is U-shaped and is recessed on each side thereof to receive the levers 6 and 7 of the shock absorber, these levers being fastened together by the bolt or rivet 20 which passes through the levers and holds them in engagement with the yoke. The bottom of the yoke provides a seat or bearing for the shackle bolt 21 to which the shackles are connected which in turn connect to the end of the spring 12. For this purpose the shackles regularly furnished with the car are used.

The operation of the shock absorber on the front axle is as follows:

When a shock occurs one or both ends of the front axle raise and through the perches the outer ends of the levers are raised as well. Through the shackles the levers raise the outer ends of the big spring 12 slightly and pull down on the ends of the small spring 14 by a greater amount thus allowing the wheel and axle to pass over the obstruction either without sensibly raising the car body or raising it very gently. On the rebound the springs 12 and 14 return to and pass beyond normal position but in so doing the ends of the spring 14 are raised by the levers 4, 5, 6 and 7 until the hooked ends 14^A come in contact with the rollers 17 by which the further upward movement of the spring 14 and the car body is arrested and in this way the rebound of the car body is retarded. During all this movement the parts operate to hold the car body centered with reference to the wheels and axle of the car.

In Figure 2 I have shown this same type of mount applied to the rear axle of a Ford car. In Figure 2, reference numeral 30 indicates the rear axle housing on the ends of which are regularly provided bolt holes which support the perches regularly furnished in the Ford car. These perches are removed and are replaced by my special perches 33 and 34 held in place by my bolts 31 and 32. On the perches are pivotally mounted the levers 35 and 36 and 37 and 38. These levers at their inner ends carry a pair of rollers between them 39 and 40, 41 and 42, suitably spaced apart which rollers support the ends of the spring 43.

This spring 43 is also a special spring forming part of my invention, the ends of which are curved up as indicated at 43^A forming the hooks or stops which on the rebound engage the upper rollers 41 and retard the further upward movement of the car body so that it cannot rise further without taking the chassis with it.

The outer ends of the springs 44 are supported by the shackles 47 and 48 for which purpose the shackles furnished with the car are used. The upper ends of these shackles are pivotally supported on the bolts 21 on which in turn is supported the metal U shaped yoke that is connected to the long levers of the shock absorber in substantially the same way as is shown in Figure 3.

The operation of the shock absorber on the rear axle is as follows:

When a shock occurs one or both of the ends of the rear axle raise and through the perches the outer ends of the levers are raised as well. Through the shackles 47 and 48 the levers raise the outer end of the big spring 44 slightly and pull down on the ends of the small spring 43^A by a greater amount thus allowing the wheel and axle to pass over the obstruction either without sensibly raising the car body or raising it very gently. When the springs return to normal the levers 35, 36, 37 and 38 rise at the inner end carrying the ends of the spring 43 up with them until the hooks on the ends thereof engage with the upper rollers 39 and 41 by which the further upward movement of the spring 43 is retarded and in this way the rebound of the car body is retarded. During all this movement the parts operate to hold the car body centered with reference to the wheels and axle of the car.

In Figure 4 I have shown a modification of the end of the lever 6 which lever is extended up and carries a V shaped pocket 60 which is filled with waste combined with oil or grease by which the roller 17 is lubricated. This modification would apply to all the levers of the shock absorbers at the inner ends thereof both on the right and left hand side of the car and at the front and back of the car. In Figure 5 I have shown a modification of the yoke shown in Figure 3 in which a cover 61 is provided therefor which makes it a closed receptacle which can be packed with waste mixed with oil or grease to form suitable lubrication to the bearings thereof.

I claim:

1. A shock absorber associated with an axle and chassis, a supporting spring for said chassis, a lever pivoted on a support formed on the axle at the outer end thereof, a short spring interposed between the chassis and the long chassis supporting spring, said lever being pivoted to the short spring at the inner end of the lever and to the long supporting spring at an intermediate point of the lever, said springs being attached to said chassis, said short spring having an upturned end, a roller carried on the lever under which said spring engages, said upturned end engaging with said roller on the rebound of the car and limiting the upward movement thereof.

2. A shock absorber for a supporting spring which comprises a spring superimposed on said supporting spring, levers connecting the ends of said supporting spring with the ends of said superimposed spring, a sliding connection between the ends of said superimposed spring and said levers, a shoulder formed on the ends of said superimposed spring said shoulder being adapted to arrest the sliding motion of the ends of said superimposed spring on said levers at a predetermined angular position of said levers to the ends of said superimposed lever, said levers being fulcrumed to cause a depression of the ends of said superimposed lever and creating a downward opposing force applied to the supporting point of said supporting spring against the upward force of said supporting spring when said fulcrum and with it the ends of said supporting spring are raised.

In testimony whereof I affix my signature.

FRANKLIN S. SPRINGSTEAD.